United States Patent
Walker et al.

(10) Patent No.: US 9,377,223 B1
(45) Date of Patent: Jun. 28, 2016

(54) THERMOS WITH PELTIER

(71) Applicants: Dakota James Walker, Mobile, AL (US); Charles Welch, Mobile, AL (US)

(72) Inventors: Dakota James Walker, Mobile, AL (US); Charles Welch, Mobile, AL (US)

(73) Assignee: George L Williamson, Fairhope, AL (US)

( * ) Notice: Subject to any disclaimer, the term of this patent is extended or adjusted under 35 U.S.C. 154(b) by 205 days.

(21) Appl. No.: 14/077,273

(22) Filed: Nov. 12, 2013

(51) Int. Cl.
  *F25B 21/02* (2006.01)
  *F25B 21/04* (2006.01)

(52) U.S. Cl.
  CPC ...................... *F25B 21/04* (2013.01)

(58) Field of Classification Search
  CPC ....................................................... F25B 21/04
  See application file for complete search history.

(56) References Cited

U.S. PATENT DOCUMENTS

| | | | |
|---|---|---|---|
| 5,042,258 A * | 8/1991 | Sundhar ............. | A47G 19/2288 62/3.2 |
| 5,421,159 A | 6/1995 | Stokes | |
| 5,572,872 A * | 11/1996 | Hlavacek ......................... | 62/3.6 |
| 5,842,353 A * | 12/1998 | Kuo-Liang ...................... | 62/190 |
| 6,032,481 A | 3/2000 | Mosby | |
| 6,134,894 A | 10/2000 | Searle | |
| 6,422,024 B1 | 7/2002 | Foye | |
| 6,591,615 B1 * | 7/2003 | Luo ................................. | 62/3.7 |
| 6,849,960 B2 * | 2/2005 | Hartman et al. .............. | 290/1 C |
| 6,852,954 B1 | 2/2005 | Liu | |
| 6,914,340 B2 * | 7/2005 | Becker et al. ................. | 290/1 R |
| 7,182,222 B2 | 2/2007 | Prabucki | |
| 8,362,628 B2 * | 1/2013 | Torino .......................... | 290/1 R |
| 2002/0121844 A1 * | 9/2002 | Ghandi et al. ................ | 310/339 |
| 2003/0005626 A1 * | 1/2003 | Yoneda .................... | A01G 9/26 47/69 |
| 2004/0130156 A1 * | 7/2004 | Hartman et al. .............. | 290/1 A |
| 2005/0121065 A1 * | 6/2005 | Otey .............................. | 136/205 |
| 2008/0180001 A1 * | 7/2008 | Dai .............................. | 310/75 B |
| 2013/0340802 A1 * | 12/2013 | Jovovic et al. ................. | 136/201 |

\* cited by examiner

*Primary Examiner* — Emmanuel Duke
(74) *Attorney, Agent, or Firm* — George L Williamson

(57) ABSTRACT

Method and apparatus for a conventional thermos bottle having a peltier mounted thereon wherein the peltier is operated by turning a crank handle on a generator assembly so that the peltier is actuated. The device is designed for use in emergency or survival situations where there is no electricity available. The device comprises a standard thermos bottle having a hole cut through the side thereon so as to receive a peltier therein. The peltier comprises an aluminum block that has fins milled out to in essence form a cooling or heating module to heat or cool liquid contained inside the thermos. The peltier is attached to the thermos using adhesives, screws or the like so as to firmly attach the aluminum block to the wall of the thermos.

10 Claims, 2 Drawing Sheets

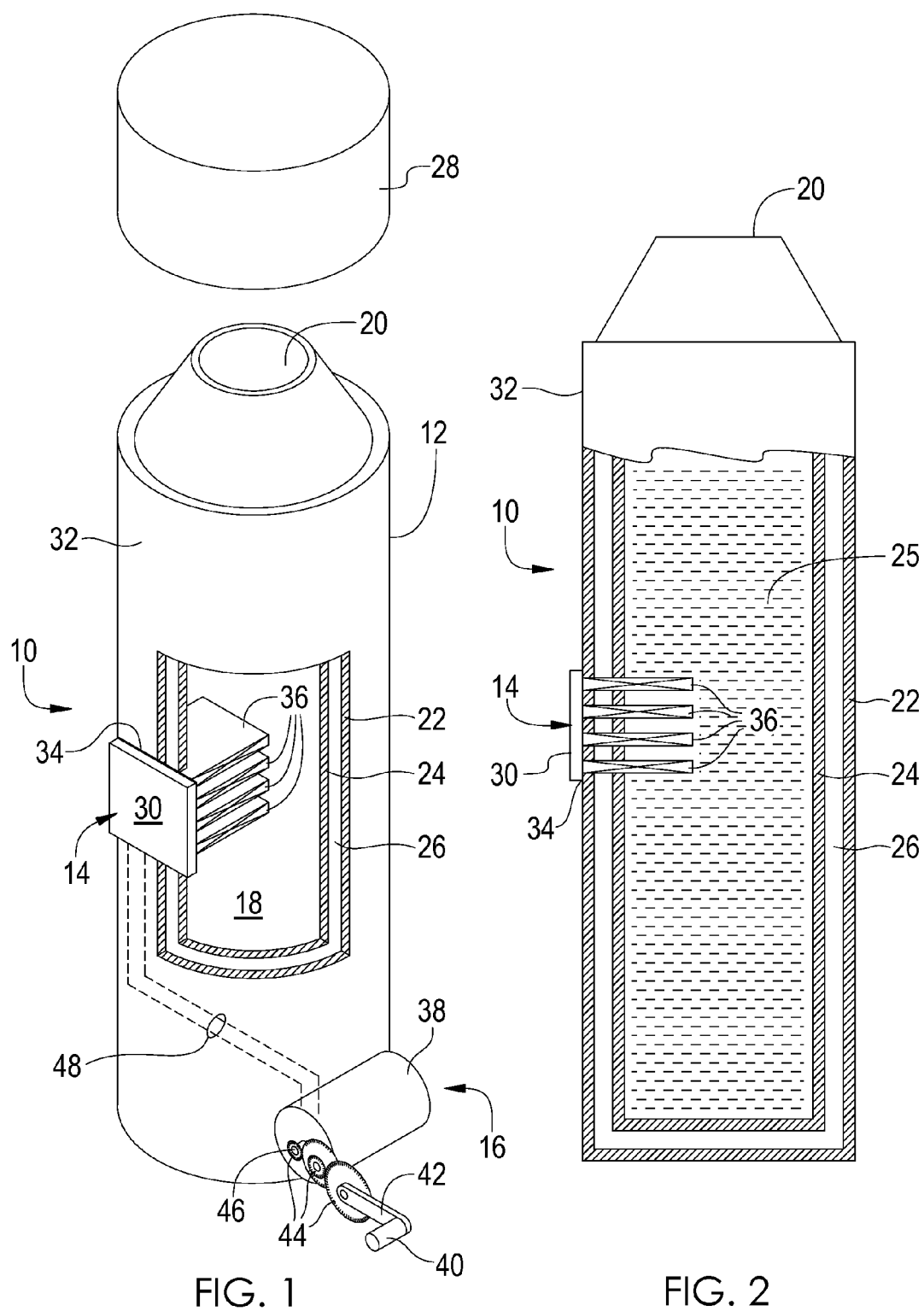

THERMOS WITH PELTIER

BACKGROUND OF THE INVENTION

1. Field of the Invention

The present invention relates generally to thermoses and, more particularly, is concerned with a thermos having a peltier mounted thereon.

2. Description of the Related Art

Devices relevant to the present invention have been described in the related art, however, none of the related art disclose the unique features of the present invention.

In U.S. Pat. No. 7,182,222 dated Feb. 27, 2007, Prabucki disclosed a solar panel and water dispenser for holding a liquid beverage. In U.S. Pat. No. 5,421,159 dated Jun. 6, 1995, Stokes disclosed a beverage cooler and dispenser. In U.S. Pat. No. 6,032,481 dated Mar. 7, 2000, Mosby disclosed a thermal regulating container. In U.S. Pat. No. 6,134,894 dated Oct. 24, 2000, Searle, et al., disclosed a method of making a beverage container with heating or cooling insert. In U.S. Pat. No. 6,422,024 dated Jun. 23, 2002, Foye disclosed an insulated beverage cooling container. In U.S. Pat. No. 6,852,954 dated Feb. 8, 2005, Liu, et al., disclosed a built-in electric heating structure for a travel mug or thermos bottle.

While these devices may be suitable for the purposes for which they were designed, they would not be as suitable for the purposes of the present invention as hereinafter described.

SUMMARY OF THE PRESENT INVENTION

The present invention discloses a conventional thermos/container bottle having a peltier mounted thereon wherein the peltier is operated by turning a crank handle so that the peltier is actuated. The present invention is designed for use in emergency or survival situations where there is no electricity available. The present invention comprises a standard thermos bottle having a hole cut through the side thereon so as to receive a peltier therein. The peltier comprises an aluminum block that has fins milled out to in essence form a cooling or heating module to heat or cool liquid contained inside the thermos. The peltier of the present invention is attached to the thermos using adhesives, screws or the like so as to firmly attach the aluminum block to the wall of the thermos.

An object of the present invention is to provide a peltier onto a conventional thermos for use in emergency situations. A further object of the present invention is to provide a peltier which can be manually operated for use in an emergency situation. A further object of the present invention is to mount the peltier having a portion extended into the liquid container area of the thermos so that the liquid contained within the thermos can be either heated or cooled. A further object of the present invention is to provide a heated or cooled thermos which can be easily operated by a user. A further object of the present invention is to provide a thermos having a peltier thereon which can be relatively inexpensively and easily manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 1 is a perspective cutaway view of the present invention.

FIG. 2 is a cross sectional view of the present invention.

LIST OF REFERENCE NUMERALS

Figure 3:
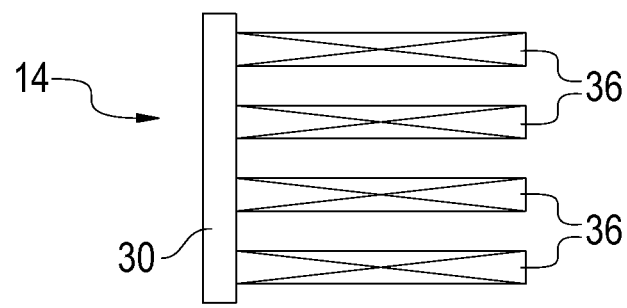
FIGS. 3 and 4 are a plan view of portions of the present invention.

With regard to reference numerals used, the following numbering is used throughout the drawings.

10 present invention
11 thermos/container
14 peltier assembly
16 generator assembly
18 superior space
20 inlet/outlet
22 outer wall
24 inner wall
25 liquid beverage
26 space
28 top
30 base
32 outer wall
34 adhesive
36 conduction fins
38 generator
40 handle
42 crank
44 gear assembly
46 central axis
48 electrical connections

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 4 illustrate the present invention wherein a thermos having a peltier mounted thereon is disclosed and which is generally indicated by reference number 10.

Figure 4:
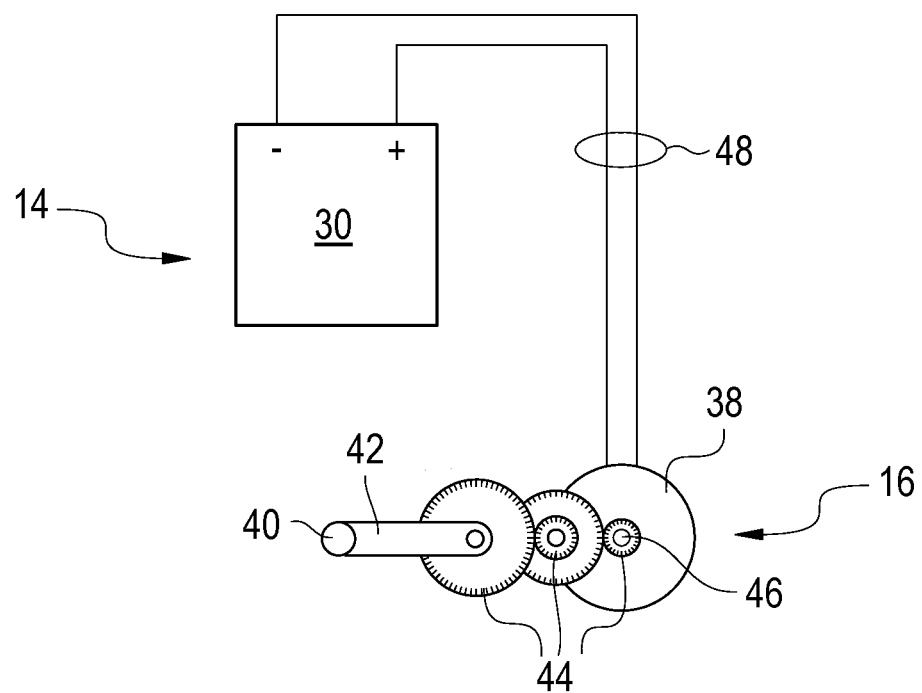

The following written description makes reference generally to all the FIGS. 1-4 and may reference specific Figures which will be indicated in the written description. Turning to FIG. 1, therein is shown the present invention 10 being a conventional thermos/container bottle 12 having a conventional peltier assembly 14 mounted thereon along with a conventional generator assembly 16 disposed thereon (the generator assembly may be disposed remote from the bottle as illustrated in FIG. 4). The thermos bottle 12 has an internal area 18 having an inlet/outlet opening 20 at its upper end for putting materials into and removing them therefrom along with an outer wall 22, an inner wall 24 for containing food items or liquid materials 25 therein along with a space 26 between the outer and inner wall which may be an air space or may comprise additional insulating materials, or, under certain circumstances, the inner and outer walls may be unitary so that no space is provided therein. Also shown is a top 28 for sealing the inlet/outlet 20 provided on the upper end of the thermos. The peltier assembly 14 comprises a base 30 attached to the wall 32 using many different methods, e.g., some sort of adhesive material or bolts, screws or the like for attaching the base to the outer wall 22 of thermos 12. Also shown are the conduction fins 36 disposed internal the thermos 12 in space 18 so that they can heat or cool beverage 25 inside the thermos. Also shown is a generator assembly 16 having a generator portion 38 having a handle 40 for being gripped by the hand of a user with a handle crank 42 mounted onto an assembly of gears 44 which turn the central axis 46 of the generator so as to provide energy to the peltier assembly 14. Also shown are the electrical connecting wires 48 for electrically connecting the generator assembly 16 to the peltier assembly 14.

Turning to FIG. 2, therein is shown the present invention 10 being a conventional thermos bottle 12 having a conventional peltier assembly 14 mounted thereon along with a conventional generator assembly 16 disposed thereon. The thermos bottle 12 has an internal area having an inlet/outlet opening 20 at its upper end for putting materials into and removing them therefrom along with an outer wall 22, an inner wall 24 for containing the liquid materials 25 therein along with a space 26 between the outer and inner wall. The peltier assembly 14 comprises a base 30 attached to the wall 32 as previously described. Also shown are the conduction fins 36 disposed internal the thermos 12 so that they can heat or cool beverage 25 inside the thermos.

Turning to FIGS. 3 and 4, therein are shown additional views of previously disclosed elements. Note FIG. 4 illustrates an embodiment wherein the generator assembly 16 is located remote from the thermos wherein the generator assembly and the thermos are separated from each other and the generator assembly is a stand alone piece of equipment unlike the embodiment shown in FIG. 1.

The peltier effect of the present invention 10 occurs whenever electrical current flows through two dissimilar conductors. Depending on the direction of current flow, the junction of the two conductors will either absorb or release heat. Regarding the present invention 10, when handle 40 is turned, e.g., clockwise, the generator assembly 16 would cause the peltier assembly 14 to, e.g., absorb heat, thereby cooling the liquid 25 contained in the thermos 12. Likewise, when handle 40 is turned in the opposite direction, i.e., counterclockwise, the liquid 25 would be heated in the thermos 12.

By way of additional information, the present invention 10, provides a thermos 12 for which the contents 25 are either heated or cooled with a peltier (heat pump) module 14. Using a standard thermos 12, a hole is cut or otherwise provided through the side to accommodate an aluminum block that has had fins 36 milled out to in essence form a cooling/heating dissipation conducting module. On this would be attached a peltier (heat pump) module 14 via screws to firmly attach it to the aluminum block with no less than three foot pounds of force and no more than five foot pounds of force, with thermal paste to assure adequate thermal bonding. The peltier (heat pump) 14 is expected to be powered by a 23 turn electric motor/generator 38 that will be hand cranked by gearing 44 to achieve roughly 13 volts. It is expected that the operator will have to achieve at least 100 revolutions per minute which will spin the electric motor 38 at least 2100 revolutions per minute, which will give 13 volts and 3 amps worth of power for 39 watts of energy. The higher the revolutions per minute of the electric motor 38 the higher the energy output and the higher the temperature from the peltier (heat pump) assembly 14.

In general, a peltier is in essence a heat pump, meaning that it will take heat from one side and transfer it to the other side. The thermoelectric effect (or peltier effect) is the direct conversion of temperature differences to electric voltage and vice versa. A thermoelectric device creates voltage when there is a different temperature on each side. Conversely, when a voltage is applied to it, it creates a temperature difference, the presence of heating or cooling at an electrified junction of two different conductors. Also, because of the low efficiency it heats more and better than it cools.

We claim:

1. An apparatus for heating or cooling the contents of a thermos bottle, comprising: a) said thermos bottle comprising spaced inner and outer walls enclosing an interior space, the outer wall having an exterior surface; b) a Peltier comprising an aluminum block mounted on said exterior surface with milled out conduction fins extending through said outer and inner walls into said interior space; c) a generator assembly for providing electrical energy to said Peltier, wherein said generator assembly is electrically connected to said Peltier; d) wherein said generator assembly is configured to be operated manually using a hand crank for providing electrical energy to said Peltier; and e) said generator assembly configured so that when said hand crank is turned in one direction the contents of said thermos bottle is heated, and when said hand crank is turned; in an opposite direction the contents of said thermos bottle is cooled.

2. The apparatus of claim 1, wherein said aluminum block is attached to said exterior surface with adhesive.

3. The apparatus of claim 2, said walls having a holes therein, wherein said conduction fins extend through said holes from said exterior surface into said interior space.

4. The apparatus of claim 3, wherein said generator assembly further comprises a generator, said generator having a centrally disposed rotating shaft, said hand crank attached to and for turning said shaft, and, a gear assembly for connecting said hand crank to said shaft.

5. The apparatus of claim 4, wherein said generator assembly is disposed directly on the thermos bottle.

6. A method for heating or cooling the contents of a thermos bottle, comprising the steps of:
   a) providing said thermos bottle comprising spaced inner and outer walls enclosing an a interior space, the outer wall having an exterior surface;
   b) providing a peltier comprising an aluminum block mounted on said exterior surface with milled out conduction fins extending through said outer and inner walls into the interior space;
   c) providing a generator assembly for providing electrical energy to the peltier, wherein the generator assembly is electrically connected to, and provides electrical energy to the peltier;
   d) configuring the generator assembly to be operated manually using a hand crank, said hand crank producing electric current flow in one direction when rotated in one direction to produce cooling in said peltier, and producing electric current flow in an opposite direction when rotated in an opposite direction to produce heating in said peltier; and
   e) turning said hand crank either clockwise or counterclockwise depending on whether heating or cooling of the contents of said thermos bottle is desired.

7. The method of claim 6, attaching the aluminum block to the exterior surface with adhesive.

8. The method of claim 7, further comprising the step of providing a hole through the wall of the container, wherein the conduction fin portion extends through the hole from the exterior surface of the container into the interior space of the container.

9. The method of claim 8, further comprising the steps of providing a generator having a centrally disposed rotating shaft and hand crank for turning the shaft, and, providing a gear assembly for connecting the hand crank to said shaft.

10. The method of claim 9, mounting the generator assembly directly on the thermos bottle.

\* \* \* \* \*